W. H. LIEBER.
CONVEYER.
APPLICATION FILED FEB. 14, 1921.

1,404,697.

Patented Jan. 24, 1922.

Inventor
W. H. Lieber
by
Attorney

UNITED STATES PATENT OFFICE.

WILLIAM H. LIEBER, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

CONVEYER.

1,404,697.    Specification of Letters Patent.    Patented Jan. 24, 1922.

Application filed February 14, 1921. Serial No. 444,781.

*To all whom it may concern:*

Be it known that I, WILLIAM H. LIEBER, a citizen of the United States, residing at West Allis, in the county of Milwaukee and State of Wisconsin, have invented a certain new and useful Improvement in Conveyers, of which the following is a specification.

This invention relates in general to improvements in the construction and operation of screw conveyers of the type comprising a central rotary rod-like member having a plurality of successive flights secured thereto to form a substantially continuous helical vane which is adapted to transport granular or pulverulent material through a conduit or along a trough.

An object of the invention is to provide a screw conveyer which is simple in construction and efficient in operation. Another object is to provide means for positively preventing the individual flights of a screw conveyer from becoming disassociated with the drive member thereof. A further object is to provide a screw conveyer having a transporting vane formed in sections which are readily reversible in order to reverse the direction of transportation of the material. Still another object is to provide means for facilitating the construction of screw conveyers from sheet material. Another object is to provide a screw conveyer having successive sections of identical construction, thus making the various similar parts interchangeable. A further object is to provide simple and efficient means for attaching the flights of a screw conveyer to a central drive element thereof. An additional object is to generally improve the type of screw conveyer disclosed in applications for patent Serial Nos. 369,396 and 369,397, both of which were filed on March 25, 1920. These and other objects of the invention will be apparent from the following description.

Some of the novel features disclosed but not specifically claimed herein form the subject of the above identified copending applications.

A clear conception of an embodiment of the invention and of the operation of a device constructed in accordance therewith, may be had by referring to the drawing accompanying and forming a part of this specification, in which like reference characters designate the same or similar parts in the several views.

Figure 1:
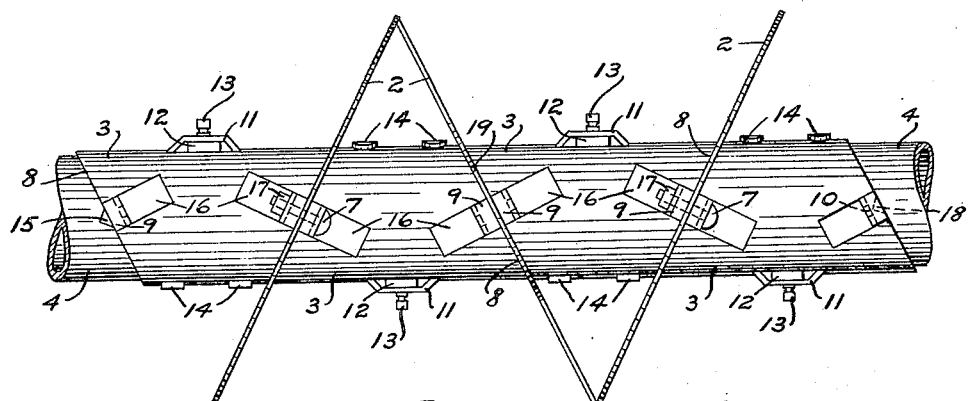
Fig. 1 is a side elevation of several successive sections of a screw conveyer having the successive flights reversibly associated with the central driving element of the conveyer.
Figure 2:
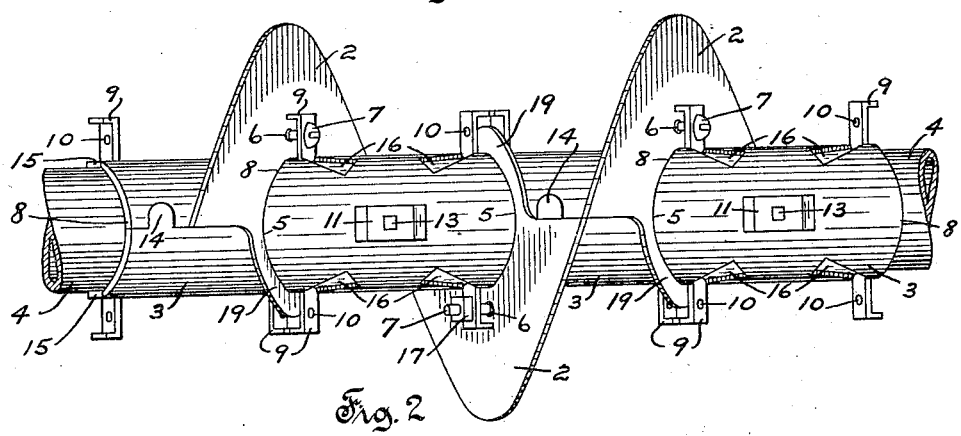
Fig. 2 is a bottom view of several successive sections of a screw conveyer having the successive flights reversibly associated with the central driving element of the conveyer.

The type of screw conveyer to which the present invention is especially applicable, comprises in general a central rod-like driving member ordinarily formed of a piece of pipe 4, a series of relatively short tubular members 3 embracing and secured to the pipe 4, and a series of reversible flight sections or blades 2 located between the successive tubular members 3 and arranged to form a substantially continuous helical vane extending along the pipe 4. The conveyer element thus formed is ordinarily located within a stationary conduit or trough, the walls of which are located directly adjacent to the periphery of the helical vane formed by the blades 2, and is rotatable to urge material deposited in the path of the blades 2 along the trough. The direction of transportation of the material depends upon the angular setting of the blades 2 and upon the direction of rotation of the conveyer rotor.

The tubular members 3 have their ends 8 disposed at a non-perpendicular angle relatively to the axis of the pipe 4, the adjacent ends of the members 3 being provided with diametrically opposite end projections 15 which are adapted to engage similarly formed recesses 18 in the ends of the adjacent members 3, in order to properly relatively position the successive tubular members 3. Each of the tubular members 3 is formed by punching a metal blank of the proper shape from a piece of sheet material, this blank after being properly punched and distorted, being rolled into tubular form and having its ends connected by means of over-lapping projections 14 which are spot welded or otherwise secured to the underlying blank end. Each of the tubular members 3 is provided with a distorted portion forming a hollow boss 11 within which a nut 12 may be located prior to insertion of the pipe 4 within the tubular member. The members 3 after being properly positioned upon the pipe 4 are securely locked in such position, by means of set screws 13 co-acting with the nuts 12 in the boss 11 and with the adjacent portions of the pipe 4. The successive tubular members 3 are of identical formation being made with a common die, thereby making them interchangeable.

Each of the tubular members 3 is provided with diametrically opposite sets of ears 9 having laterally bent outer portions directed towards the ends 8 of the members 3. The ears 9 are formed by punching and distorting metal of the blanks from which the tubular members are made, at the openings 16. The adjacent ends 8 of the successive tubular members 3 and the bent portions of the adjacent ears 9 are spaced apart a definite distance by the projections 15 to form substantially annular grooves between the members 3, these grooves lying in planes which are non-perpendicular relative to the axis of the pipe 4.

Figure 3:
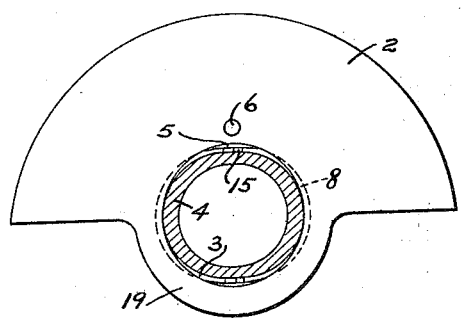
Fig. 3 is a transverse section through a screw conveyer of the type disclosed in Figs. 1 and 2, the section being taken in the plane of one of the conveyer blades.

The blades 2 are likewise formed with the aid of a die being of identical construction and therefore interchangeable. Each of the blades 2, as shown in Fig. 3, comprises a substantially semi-circular vane portion and a substantially circular retaining portion 19 formed integral with the vane portion. The blades 2 are each provided with a substantially circular central opening 5 the diameter of which is substantially equal to the major diameter of the elliptical cross-section of the pipe 4 in the plane of the finally attached blade. With the structure assembled, the portion of each blade 2 directly adjacent to the circular opening 5 therein is located in a recess provided by the pair of adjacent tubular members 3, the portion 19 of the blade forming a strap which completely encircles the supporting pipe 4. Each of the blades 2 is further provided with an opening 6 which with the blade properly positioned upon the pipe 4, may be brought into alinement with openings 10 formed in an adjacent set of ears 9. The successive blades 2 may be secured to these sets of ears 9 by means of bolts 7 and nuts 17 coacting with the blades 2 and with the ears 9. The ears 9 may be brought into firm engagement with the adjacent portions of intervening blades 2, by manipulation of the nuts 17 and the bolts 7.

With the successive blades 2 positioned as shown in the drawing, rotation of the supporting pipe 4 in a given direction will advance material deposited in the path of the blades 2, in a definite direction longitudinally of the conveyer trough. The direction of transportation of the material may be reversed either by reversing the direction of rotation of the pipe 4, or by advancing the blades 180° about the longitudinal axis of the pipe 4. Such adjustment of the blades 2 in order to effect reversal of the direction of transportation of the material without reversing the direction of rotation of the pipe 4, may be effected by merely removing the locking bolts 7 and swinging each of the successive blades 2 through an angle of 180°. The blades 2 may then be relocked to the pipe 4 by inserting the bolts 7 within the holes 10 of the sets of the then adjacent ears 9. Such adjustment of the blades 2 about the pipe 4 without disturbing the tubular members 3, is permitted by the provision of the circular opening 5 of a diameter substantially equal to the major diameter of the adjacent elliptical cross-section of the pipe 4.

An objection to the prior screw conveyers of this general type has been the inability to prevent disassociation of the flights from the supporting pipe 4. When a flight or blade 2 thus becomes disassociated it is urged along the conveyer trough and is delivered to machinery such as a bolter wherein great damage is often done. Such injury of other machinery is positively prevented with the present improved structure, as the blades 2 can not become disassociated from the pipe 4 even if the locking bolts 7 should break or become dislodged.

While it has heretofore been proposed to positively prevent the dropping off of blades 2 by providing strap like portions embracing the main shaft, these prior structures did not permit adjustment of the blades without necessitating complete removal of lateral displacement thereof. This objection to the prior devices of this type, is eliminated by merely making the hole 5 circular instead of elliptical to conform with the adjacent cross-section of the supporting pipe 4.

It will be noted that the tubular members 3 and the blades 2 may be readily formed of sheet metal with the aid of dies, and that due to relatively small amount of stock necessary to form the blanks for these elements, the cost of construction may be reduced to a minimum by utilizing scrap material resulting from the formation of larger sheet metal articles.

It should be understood that it is not desired to limit the invention to the exact details of construction and of operation herein shown and described, for various modifications within the scope of the appended claims may occur to persons skilled in the art.

It is claimed and desired to secure by Letters Patent:

1. In combination, a shaft having an axis, a conveyer blade, and means for securing said blade to said shaft in a plane non-perpendicular to said axis, said blade being formed to permit adjustment about said shaft by shifting said blade in said plane.

2. In combination, a shaft having a non-circular cross-section lying in a plane which is oblique relative to the shaft axis, a conveyer blade, and means for securing said blade to said shaft in the plane of said cross-section, said blade being formed to permit adjustment about said shaft by shifting said blade in said plane.

3. In combination, a shaft having an elliptical cross-section lying in a plane which is oblique relative to the shaft axis, a conveyer blade, and means for securing said blade to said shaft in the plane of said cross-section, said blade being formed to permit adjustment about said shaft by shifting said blade in said plane.

4. In combination, a cylindrical shaft, a conveyer blade having a hole penetrated by said shaft, said hole being of sufficient size to permit angular adjustment of said blade about said shaft in a plane non-perpendicular to said shaft, and means for securing said blade to said shaft while disposed in said plane.

5. In combination, a shaft having a non-circular cross-section lying in a plane which is oblique relative to the shaft axis, a one piece conveyer blade having a circular hole penetrated by said shaft, said hole having a diameter substantially equal to the maximum dimension of said non-circular shaft cross-section, and means for securing said blade to said shaft while disposed in the plane of said non-circular cross-section.

6. In combination, a cylindrical shaft, a one piece conveyer blade having a circular hole penetrated by said shaft, said hole having a diameter sufficiently great to permit rotation of said blade about said shaft in a plane non-perpendicular to said shaft, and means for securing said blade to said shaft while disposed in said plane.

7. In combination, a circular shaft having an axis and an elliptical cross-section in a plane non-perpendicular to said axis, and a conveyer blade having a circular hole penetrated by said shaft, the diameter of said hole being substantially equal to the major diameter of said elliptical cross-section.

8. In combination, a shaft having an axis, a tubular member embracing said shaft and having an end surface lying in a plane which is non-perpendicular to said shaft axis, and a blade having a portion surrounding said shaft and engaging said member surface, said blade being formed to permit adjustment about said shaft by shifting said blade while in engagement with said member surface.

9. In combination, a shaft having an axis, a tubular member embracing said shaft and having an end surface lying in a plane which is non-perpendicular to said axis, a blade engaging said member surface and formed to permit adjustment about said shaft by shifting said blade while in engagement with said member surface, and means for securing said blade to said member.

10. In combination, a cylindrical shaft having an axis, a tubular member embracing said shaft and having an end lying in a plane extending at an angle to said axis, and a blade having a portion remote from said shaft lying in a plane non-perpendicular to said axis and having another portion engaging said member surface, said blade being formed for rotative movement about said shaft while in engagement with said member surface.

11. In combination, a shaft having an axis, and a blade having a portion remote from said shaft lying in a plane non-perpendicular to said axis and having another portion surrounding and engaging said shaft, said blade being formed for rotative movement about said shaft while maintaining the relative angularity of said remote portion and said axis.

12. In combination, a pair of coaxial tubular members having a recess between them lying in a plane which is inclined relatively to the axis of said members, and a blade having a portion surrounding said axis and extending into said recess, said blade being formed to permit adjustment about said axis while retaining said portion within said recess and without increasing the width of said recess.

13. In combination, a pair of coaxial tubular members having plane adjacent end surfaces forming a recess lying in a plane which is inclined relatively to the axis of said members, and a blade having a portion surrounding said axis and extending into said recess, said blade being formed to permit adjustment about said axis while retaining said members in fixed position relatively to each other.

In testimony whereof, the signature of the inventor is affixed hereto.

WILLIAM H. LIEBER.